United States Patent
Josefczyk et al.

(10) Patent No.: US 9,863,321 B2
(45) Date of Patent: Jan. 9, 2018

(54) HOT GAS EXPANDER INLET CASING ASSEMBLY AND METHOD

(71) Applicant: Elliott Company, Jeannette, PA (US)

(72) Inventors: Ronald John Josefczyk, Sarver, PA (US); Carl John Schuster, Jeannette, PA (US)

(73) Assignee: Elliott Company, Jeannette, PA (US)

( * ) Notice: Subject to any disclaimer, the term of this patent is extended or adjusted under 35 U.S.C. 154(b) by 481 days.

(21) Appl. No.: 13/982,552

(22) PCT Filed: Dec. 27, 2012

(86) PCT No.: PCT/US2012/071716
§ 371 (c)(1),
(2) Date: Jul. 30, 2013

(87) PCT Pub. No.: WO2013/101873
PCT Pub. Date: Jul. 4, 2013

(65) Prior Publication Data
US 2014/0053573 A1 Feb. 27, 2014

Related U.S. Application Data

(60) Provisional application No. 61/581,382, filed on Dec. 29, 2011.

(51) Int. Cl.
*F01D 25/24* (2006.01)
*F02C 7/20* (2006.01)
*F01D 11/18* (2006.01)

(52) U.S. Cl.
CPC ............... *F02C 7/20* (2013.01); *F01D 11/18* (2013.01); *F01D 25/246* (2013.01);
(Continued)

(58) Field of Classification Search
CPC .......... F01D 9/04; F01D 11/18; F01D 25/246; F02C 7/20; F05D 2220/62; F05D 2230/64; F05D 2230/642; F05D 2240/11
See application file for complete search history.

(56) References Cited

U.S. PATENT DOCUMENTS 2,955,800 A   10/1960   Miller et al.
3,262,677 A    7/1966   Bobo et al.
(Continued)

FOREIGN PATENT DOCUMENTS

CH       639171 A5    10/1983
EP     1041249 A2     4/2000
(Continued)

*Primary Examiner* — Arun Goyal
(74) *Attorney, Agent, or Firm* — The Webb Law Firm

(57) ABSTRACT

A gas turbine device includes an inlet casing and a stator diaphragm provided inside the inlet casing. The stator diaphragm has an integral inner stator shroud and an outer stator shroud and a plurality of stator vanes provided in a circumferential arrangement between the inner stator shroud and the outer stator shroud. A plurality of key slots is provided in a circumferential arrangement on the stator diaphragm and a corresponding plurality of key slots is provided in a circumferential arrangement on the inlet casing. The key slots provided on the stator diaphragm are aligned with the plurality of key slots provided on the inlet casing. A key is inserted into each of the plurality of key slots provided to prevent rotation of the stator diaphragm with respect to the inlet casing. The stator diaphragm is secured in an axial direction by a stator shear ring.

17 Claims, 6 Drawing Sheets

(52) U.S. Cl.
CPC .... *F05D 2220/62* (2013.01); *F05D 2230/642* (2013.01); *F05D 2240/12* (2013.01); *Y10T 29/49323* (2015.01)

(56) References Cited

U.S. PATENT DOCUMENTS

| | | | |
|---|---|---|---|
| 4,083,648 A | 4/1978 | Asplund | |
| 4,632,634 A | 12/1986 | Vinciguerra et al. | |
| 4,687,413 A | 8/1987 | Prario | |
| 5,272,869 A | 12/1993 | Dawson et al. | |
| 5,913,660 A | 6/1999 | Knott | |
| 6,435,820 B1 | 8/2002 | Overberg | |
| 6,942,453 B2 * | 9/2005 | Tsuru | F01D 25/246 415/209.4 |
| 7,494,317 B2 | 2/2009 | Keller et al. | |
| 7,686,575 B2 | 3/2010 | Chehab et al. | |
| 9,127,569 B2 * | 9/2015 | Akiyama | F01D 11/24 |
| 2004/0086383 A1 | 5/2004 | Couture et al. | |
| 2004/0240992 A1 | 12/2004 | Bongrand et al. | |
| 2007/0253809 A1 | 11/2007 | Glynn et al. | |
| 2008/0148737 A1 | 6/2008 | Ellis et al. | |

FOREIGN PATENT DOCUMENTS

| | | | |
|---|---|---|---|
| EP | 1106784 | A2 | 7/2000 |
| JP | 6095103 | A | 5/1985 |
| JP | 200556485 | A | 3/2005 |

\* cited by examiner

HOT GAS EXPANDER INLET CASING ASSEMBLY AND METHOD

BACKGROUND OF THE INVENTION

Field of the Invention

This disclosure relates, in general, to gas turbine devices, and more particularly, to a hot gas expander inlet casing assembly and method for installing inlet casing components of a hot gas expander.

Description of the Related Art

Energy recovery devices may be utilized in various industries to recover at least a part of energy that would otherwise be wasted. Typically, an energy recovery device is integrated into an industrial process to capture waste energy and extract power therefrom. The recovered energy may be used to drive other equipment in the industrial process, such as an air compressor or a generator. Energy recovery devices increase the overall efficiency of the industrial process and may be utilized in various applications, including blast furnaces in steel mills, cryogenic process devices in air separation plants, and fluid catalytic cracking (FCC) process plants in oil refineries.

One example of an energy recovery device is a hot gas expander commonly utilized in the oil refinery industry. Hot gas expanders capture waste flue gas energy from an FCC process to recover heat energy that would otherwise be lost through one or more pressure reducing valves or throttling valves. Hot gas expanders operate on a turbine engine principle whereby energy is extracted from a flow of hot flue gas. Typically, hot flue gas passes over the nose cone of the expander, past a plurality of stator blades, and engages a plurality of rotor blades. Rotation of the rotor blades relative to the stator blades extracts the kinetic energy of the flue gas and converts it into rotational energy of the rotating shaft which supports the rotor blades. The rotating shaft may power a compressor, a generator, or other equipment.

The rotating shaft and the plurality of rotor blades are disposed inside an expander housing and are enclosed by a shroud assembly fastened to the housing by one or more rings. Typically, the one or more rings are made from a series of arcuate segments that are fastened or welded together. The rings are typically attached to the housing using high-temperature fasteners. The assembly process requires extensive machining to ensure a proper fit of the components. Close tolerances must be maintained in the gap between the rotor blades and the inner surface of the ring immediately adjacent to the rotor blades in order to improve the efficiency of the hot gas expander. Additionally, the arcuate segments must be machined to a high-tolerance in order to assure proper alignment of the bolt holes on the rings with the bolt holes on the housing and/or the shroud assembly. Further machining steps may be required on the housing and/or the shroud assembly to ensure proper seating of the rings.

Within the prior art, U.S. Pat. No. 6,435,820 to Overberg discloses a shroud assembly that includes a plurality of arcuate shrouds held in position by a shroud support which, in turn, is supported by the engine outer case in a conventional manner. The shroud assembly further includes a plurality of retainer plates arranged in an annular array which function to limit aft axial movement of C-clips. The retainer plates may be formed as segmented plates to accommodate thermal expansion. The retainer plate is secured to the shroud support with bolts.

United States Patent Application Publication No. 2007/0253809 to Glynn et al. is directed to a method of assembling a seal assembly within a gas turbine engine. The method includes coupling a stationary stator member to a gas turbine engine including a rotating member, and coupling a primary seal assembly and a secondary seal assembly to the stationary stator member. The primary seal assembly includes a moveable stator member including at least one keyed slot, and at least one biasing member including at least one key. The key is slidably coupled within the keyed slot to facilitate aligning the primary seal assembly and the secondary seal assembly with respect to the gas turbine engine. The seal assembly facilitates sealing between the stationary stator member and the rotating member.

U.S. Pat. No. 7,494,317 to Keller et al. discloses a system for attaching a ring seal to a vane carrier in a turbine engine such that the ring seal may radially expand and contract independently of the vane carrier. The system can also be configured to substantially restrict axial and/or circumferential movement of the ring seal. The ring seal includes a plurality of radial slots circumferentially spaced about the ring seal. A pin can extend substantially through each of the slots and into operative engagement with isolation rings which are connected to the vane carrier.

U.S. Pat. No. 7,686,575 to Chehab et al. is directed to an inner mounting ring for gas turbine flow path components, such as shroud ring segments. The inner ring is mounted to an outer ring on radially slidable mounts that maintain the two rings in coaxial relationship, but allows them to thermally expand at different rates. This arrangement allows matching of the radial expansion rate of the inner ring to that of the turbine blade tips, thus providing reduced clearance between the turbine blade tips and the inner surface of the shroud ring segments under all engine operating conditions.

With reference to FIG. 1, a known hot gas expander 10 includes an inlet casing 20 and a discharge casing 30 attached to a housing 40. Inlet casing 20 receives hot gas from an industrial process while discharge casing 30 exhausts the gas after it has been passed through hot gas expander 10. Housing 40 supports a shaft assembly 50 rotatable about a longitudinal axis 60. Shaft assembly 50 includes a disc 70 disposed between inlet casing 20 and discharge casing 30. Disc 70 includes a plurality of rotor vanes 80 provided on an outer peripheral edge of disc 70. A plurality of stator blades (not shown in FIG. 1) may be provided adjacent to rotor vanes 80 to redirect the hot gases that pass through hot gas expander 10.

Inlet casing 20 may be made of a first material having a first coefficient of thermal expansion, while discharge casing 30 may be made of a second material having a second, different coefficient of thermal expansion. Similarly, disc 70 and rotor vanes 80 may also have a different coefficient of thermal expansion from inlet casing 20 and discharge casing 30. A clearance space is provided between an inner wall of inlet casing 20 and the outermost edges of rotor vanes 80 to account for the dimensional changes of the components during the operating cycle of hot gas expander 10. Differences in coefficients of thermal expansion between these components and their support structures determine the magnitude and variability of the clearance space.

With reference to FIGS. 2-3, another embodiment of the known hot gas expander 10 is shown. In this embodiment, an inner stator shroud 90 is mounted concentrically within an outer rotor shroud 100 inside a retaining groove formed on inlet casing 20. Similarly, rotor shroud 100 is mounted inside a retaining groove formed on inlet casing 20. Stator shroud 90 and rotor shroud 100 are secured to inlet casing 20 by a plurality of mechanical fasteners 110. Stator shroud 90 may have a first half section and a second half section joined at abutting ends. Similarly, rotor shroud 100 may have a first half section and a second half section joined at abutting ends. The plurality of mechanical fasteners 110, such as high-temperature bolts, may be utilized to couple the first half section and the second half section of stator shroud 90 and/or rotor shroud 100.

With continuing reference to FIGS. 2-3, a plurality of individual stator vanes 120 is provided within inlet casing 20. Stator vanes 120 are preferably arranged in a circular arrangement concentric with longitudinal axis 60 of shaft 50 (not shown in FIGS. 2-3). Individual stator vanes 120 are inserted into a retaining groove 130 on inlet casing 20. Stator shroud 90 retains stator vanes 120 in place and prevents their longitudinal movement during operation of hot gas expander 10. Fastening means 110 secure stator shroud 90 to inlet casing 20 at the stator vane 120 inside diameter. Rotor shroud 100 is provided on the outside diameter of rotor vanes 80 and is secured to inlet casing 20 by fasteners 110.

Because components of the hot gas expander are subject to differential thermal expansion during various operating stages of the device, such as powering up to or down from normal operating speed, a large gap between the rotor blades and the inner surface of the ring is often required as a factor of safety for reducing thermal stresses in the energy recovery device. The gap is also a function of material properties for the various components of the hot gas expander. Because the rotor blades are typically manufactured from a different material than the rings, the rotor blades have a different coefficient of thermal expansion compared to the rings. The difference in material properties causes the rotor blades to expand or contract at a different rate and by a different amount compared to the rings during various operating stages of the hot gas expander. This differential expansion may cause a high stress condition in the stator vanes that eventually leads to warping and catalyst entrainment. On the other hand, an increase in the gap between the components leads to a reduction in operating efficiency of the hot gas expander. Such a reduction in operating efficiency is often accompanied by increased operating costs and lower environmental compliance.

Similarly, bolts that secure the rings to the housing and/or the shroud are typically manufactured from a different material than the rings or the housing/shroud assembly. During the various operating stages of the hot gas expander, the bolts expand or contract at a different rate and by a different amount compared to the rings or the housing/shroud assembly. This difference in expansion and contraction causes fluctuations in bolt tension, which ultimately may lead to bolt failure due to material fatigue.

SUMMARY OF THE INVENTION

In view of the foregoing, a need exists for a hot gas expander inlet casing assembly and method for installing inlet casing components of a hot gas expander whereby thermal stresses caused by differential thermal expansion of the components are reduced. An additional need exists for a hot gas expander inlet casing assembly and method for installing inlet casing components of a hot gas expander whereby the assembly and method improve the operating efficiency of the hot gas expander, lower operating costs, reduce maintenance expenses, and enhance environmental compliance. As described in detail herein, a hot gas expander inlet casing assembly and method for installing inlet casing components of a hot gas expander are disclosed.

Generally, the assembly and assembly method described in detail herein comprise a stator diaphragm with integral inner and outer stator shrouds inserted into the inlet casing with a small radial clearance for thermal expansion. The stator diaphragm is positioned concentric with a flow path of the inlet casing by a plurality of entry keys inserted from the discharge end. The keys resist the rotational torque of the stator assembly and also allow differential radial thermal growth of the stator assembly while maintaining concentricity. The stator diaphragm is retained axially in the inlet casing by a multi-segment shear ring. The use of a shear ring for axial retention eliminates the need for the superalloy internal bolting. A rotor blade shroud is attached in a similar manner as the stator diaphragm. The rotor blade shroud is positioned concentric with the flow path of the inlet casing by a plurality of entry keys inserted from the discharge end. The keys allow differential radial thermal growth of the stator assembly while maintaining concentricity. The rotor blade shroud captures the stator shear ring during operation addresses the possibility of the shear ring coming loose and entering the flow path. In addition, the rotor shroud is retained axially in the inlet assembly by a three segment shear ring similar to the stator shear ring.

According to one embodiment, a gas turbine device may include an inlet casing provided opposite a discharge casing along a longitudinal axis of the gas turbine device. A shaft may be disposed between the inlet casing and the discharge casing such that the shaft is rotatable about the longitudinal axis of the gas turbine device. A plurality of rotor vanes desirably extends in a radial direction away from the shaft. A stator diaphragm may be provided inside the inlet casing, the stator diaphragm desirably having an integral inner stator shroud and an outer stator shroud located concentric to the flow path inside the inlet casing. A plurality of stator vanes may be provided in a circumferential arrangement between the inner stator shroud and the outer stator shroud.

In another embodiment, the gas turbine device may further include a plurality of key slots provided in a circumferential arrangement on the stator diaphragm and a corresponding plurality of key slots provided in a circumferential arrangement on the inlet casing. The plurality of key slots provided on the stator diaphragm may be aligned with the plurality of key slots provided on the inlet casing. A plurality of keys may be adapted for inserting into the plurality of key slots provided on the stator diaphragm and the inlet casing to prevent rotation of the stator diaphragm with respect to the inlet casing about the longitudinal axis of the gas turbine device.

According to a further embodiment, the stator diaphragm may be provided inside a retaining groove on the inlet casing. A radial clearance space may be provided between the stator diaphragm and the retaining groove to allow for thermal expansion of the stator diaphragm. In accordance with this embodiment, the stator diaphragm may be secured in an axial direction by a stator shear ring having a plurality of ring segments coupled at their respective ends. Desirably, the stator shear ring may be disposed inside a stator ring groove provided inside the inlet casing. In some embodiments, the stator ring groove may be provided inside the retaining groove of the inlet casing.

Additionally, the gas turbine device may further include a seal provided at the interface between the stator diaphragm and nose cone of the gas turbine device. The seal may be adapted to prevent leakage of working fluid between the stator diaphragm and the nose cone.

Moreover, the gas turbine device may further include a rotor shroud provided inside the inlet casing. The rotor shroud may be located concentric to the plurality of rotor vanes. A plurality of key slots may be provided in a circumferential arrangement on the rotor shroud and a corresponding plurality of key slots may be provided in a circumferential arrangement on the inlet casing. The plurality of key slots provided on the rotor shroud is desirably aligned with the plurality of key slots provided on the inlet casing. A plurality of keys may be adapted for inserting into the plurality of key slots provided on the rotor shroud and the inlet casing to prevent rotation of the rotor shroud with respect to the inlet casing about the longitudinal axis of the gas turbine device.

Further, the rotor shroud may be provided inside a retaining groove inside the inlet casing. A radial clearance space may be provided between the rotor shroud and the retaining groove to allow for thermal expansion of the rotor shroud. The rotor shroud may be secured in an axial direction by a rotor shear ring having a plurality of ring segments coupled at their respective ends. The rotor shear ring may be disposed inside a rotor ring groove provided inside the inlet casing. In certain embodiments, the rotor ring groove may be provided inside the retaining groove of the inlet casing.

In a method of assembling inlet casing components of a gas turbine device according to one exemplary embodiment, the method may include a step of providing a gas turbine device that has an inlet casing provided opposite a discharge casing along a longitudinal axis of the gas turbine device. The gas turbine device may also include a shaft disposed between the inlet casing and the discharge casing, such that the shaft is rotatable about the longitudinal axis of the gas turbine device. Additionally, the gas turbine device may include a plurality of rotor vanes extending radially from the shaft and a stator diaphragm provided inside the inlet casing, the stator diaphragm having an integral inner stator shroud and an outer stator shroud located concentric to the flow path inside the inlet casing. Furthermore, the gas turbine device may include a plurality of stator vanes provided in a circumferential arrangement between the inner stator shroud and the outer stator shroud. The assembly method may further include a step of providing a retaining groove inside the inlet casing, the retaining groove having a plurality of key slots in a circumferential arrangement.

In another aspect, the assembly method may include a step of inserting the stator diaphragm inside the retaining groove such that a plurality of key slots provided in a circumferential arrangement on the stator diaphragm are aligned with a plurality of key slots on the retaining groove. The method may further include a step of securing the stator diaphragm inside the retaining groove by inserting a key into each of the plurality of key slots on the stator diaphragm and the retaining groove. Additionally, the method may include a step of installing a stator shear ring inside a stator ring groove provided on the retaining groove to prevent or limit axial movement of the stator diaphragm.

In yet another aspect, the assembly method may further include a step of inserting a rotor shroud inside the retaining groove such that a plurality of key slots provided in a circumferential arrangement on the rotor shroud is aligned with a plurality of key slots on the retaining groove. Additionally, the method may include a step of securing the rotor shroud inside the retaining groove by inserting a key into each of the plurality of key slots on the rotor shroud and the retaining groove. The method may also include a step of installing a rotor shear ring inside a rotor ring groove provided on the retaining groove to prevent axial movement of the rotor shroud.

In accordance with another embodiment, the keys for securing the stator diaphragm and the rotor shroud inside the inlet casing may be dimensioned such that they maintain concentricity of the stator diaphragm and the rotor shroud with respect to the inlet casing while allowing for differential radial thermal growth of the rotor shroud and the stator diaphragm with respect to the retaining groove. A radial clearance space may be provided between the stator diaphragm and the retaining groove to allow for thermal expansion of the stator diaphragm. Further, a radial clearance space may be provided between the rotor shroud and the retaining groove to allow for thermal expansion of the rotor shroud.

These and other features and characteristics of the hot gas expander inlet assembly, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
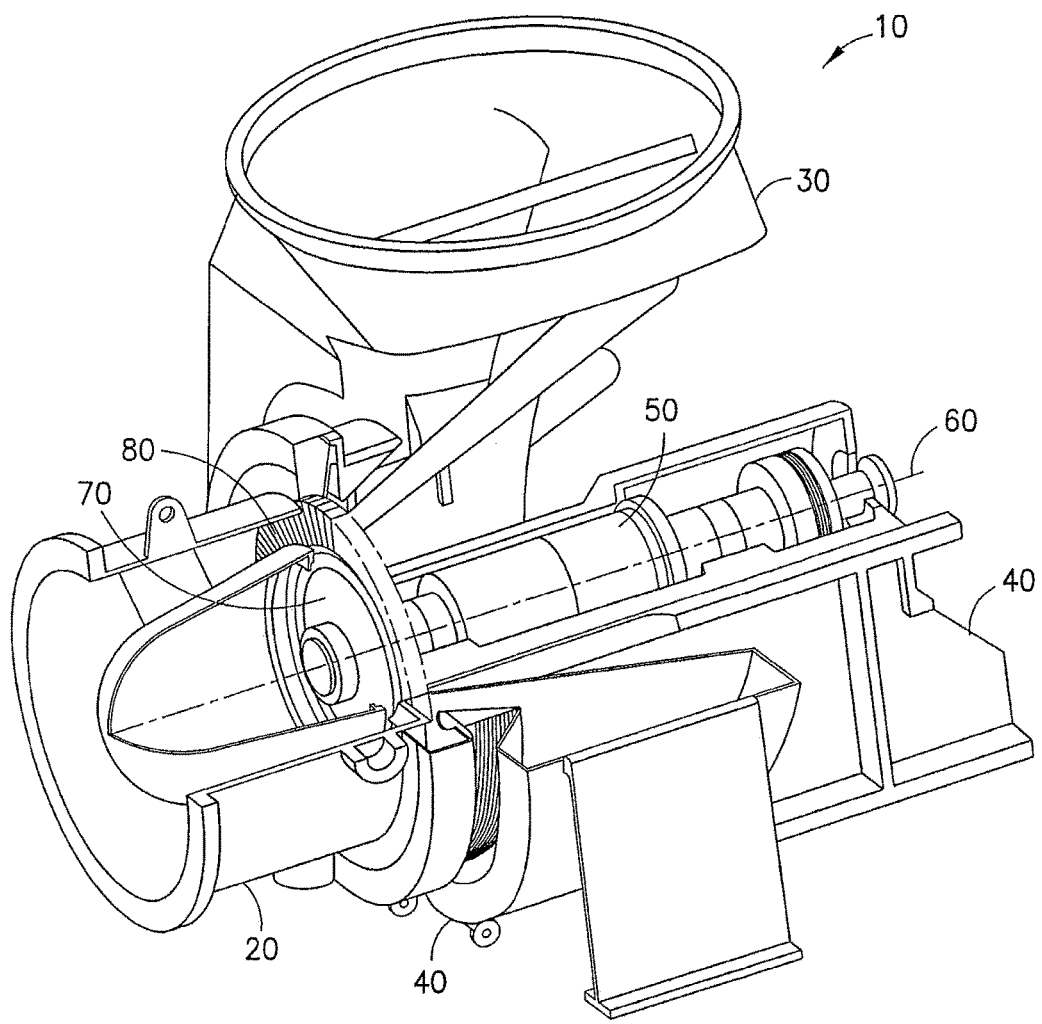
FIG. 1 is a perspective and partially cutaway view of a known hot gas expander.

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The hot gas expander inlet casing assembly and method for installing inlet casing components of a hot gas expander provides for improvement in operating efficiency and reduction in manufacturing and operating costs of a gas turbine device, such as a hot gas expander. Referring to the drawings in which like reference characters refer to like parts throughout the several views thereof, various embodiments and features of a hot gas expander inlet casing assembly and method for installing inlet casing components of a hot gas expander will be described and are desirable for improving operating efficiency of hot gas expanders and lowering their manufacturing and maintenance costs.

Figure 2:
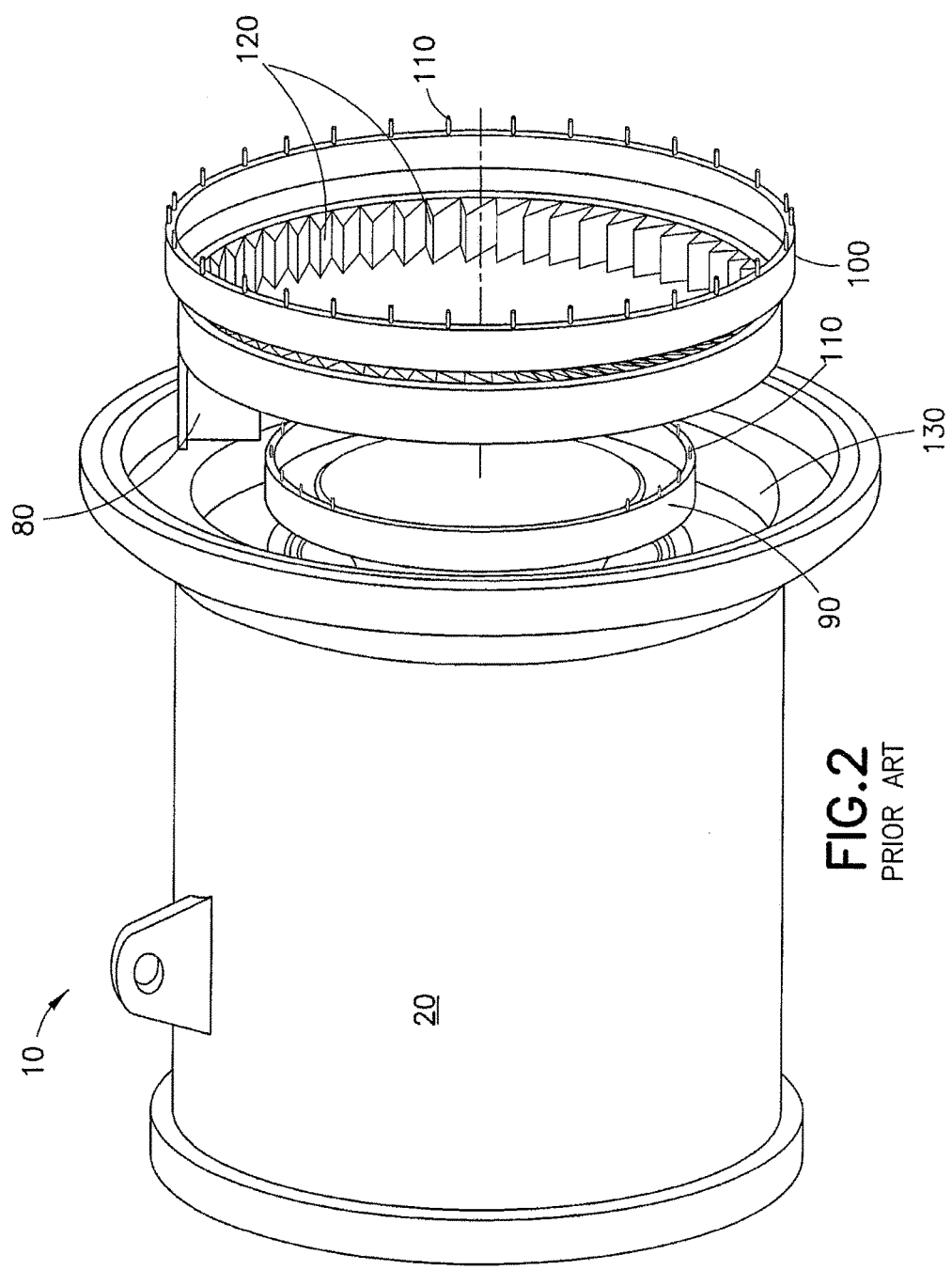
FIG. 2 is a partially exploded view of a known hot gas expander assembly.
Figure 3:
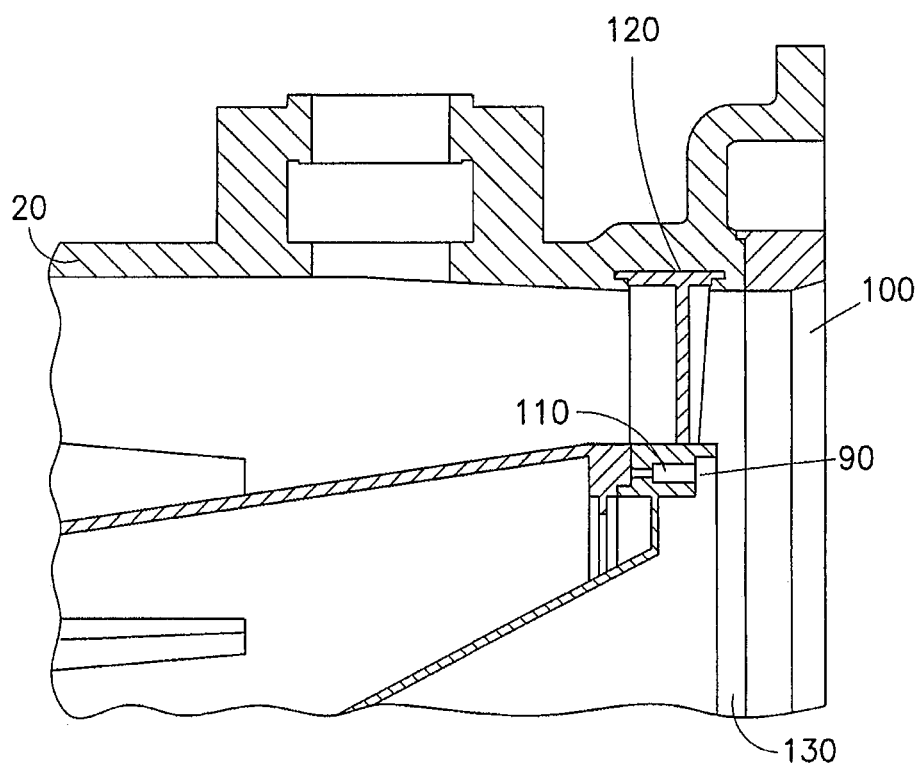
FIG. 3 is a cross-sectional view of the known hot gas expander assembly shown in FIG. 2.

In the known hot gas expanders 10 shown in FIGS. 1-3, installation of the hot gas expander components requires high manufacturing precision in order to ensure that the clearance space between an inner wall of inlet casing and the outermost edges of rotor vanes is adequate to allow for thermal expansion and contraction of various parts during operation. In order to achieve such high manufacturing tolerance, precision machining operations are necessary for stator and rotor shrouds 90, 100. As these known hot gas expanders 10 are prone to high thermal stresses, especially at the location of the mechanical fasteners 110 which expand at a different rate compared to the surrounding components. Repeated thermal cycling may ultimately lead to the failure of the mechanical fasteners 110. Accordingly, installation costs for the known hot gas expanders 10 shown in FIGS. 1-3 are increased due to the need for specialized superalloy materials to manufacture the mechanical fasteners 110 and stator and rotor shrouds 90, 100. Such materials are necessary to withstand the high operating temperature of hot gas expander 10.

Figure 4:
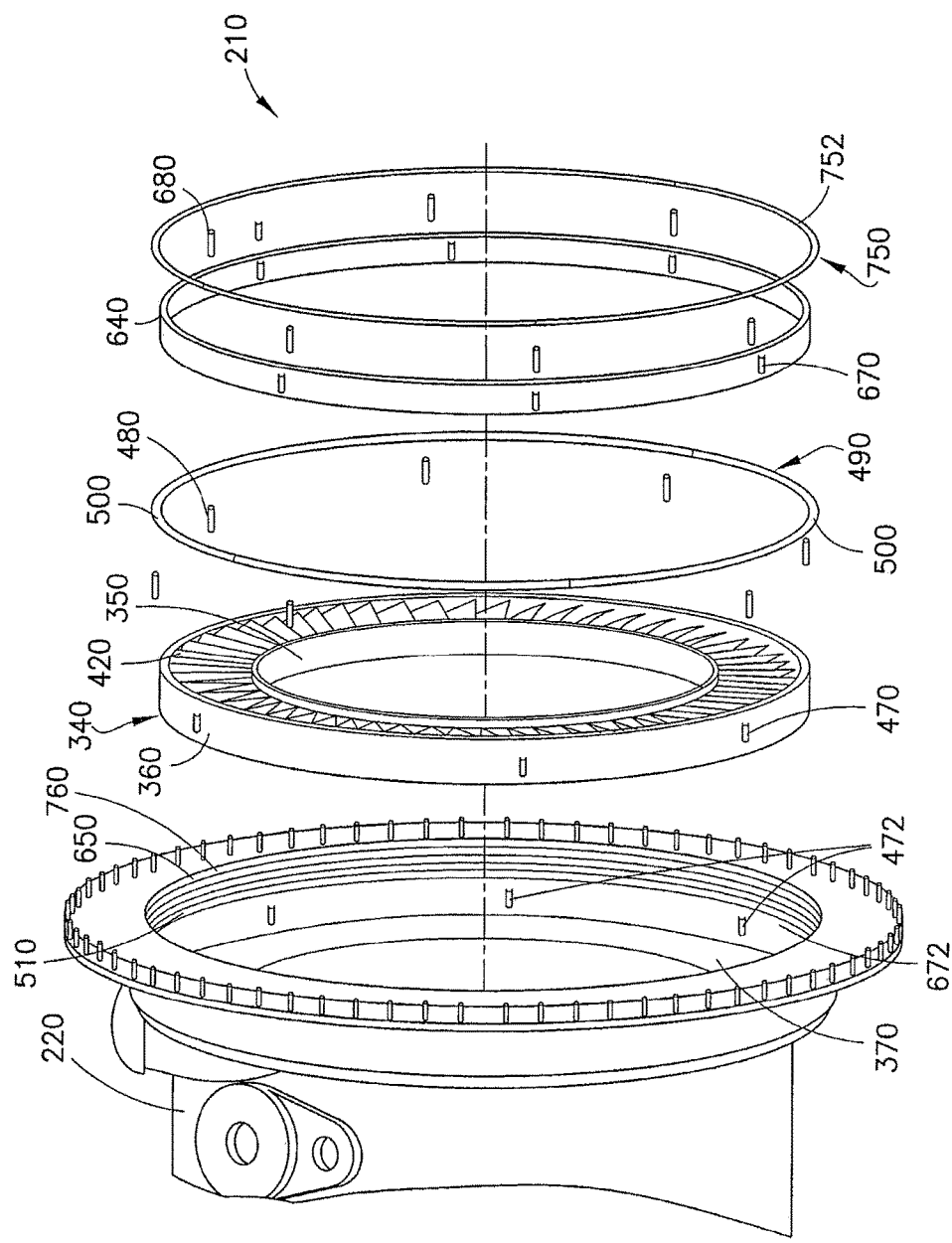
FIG. 4 is an exploded view of a hot gas expander assembly according to one embodiment of the present invention.
Figure 5:
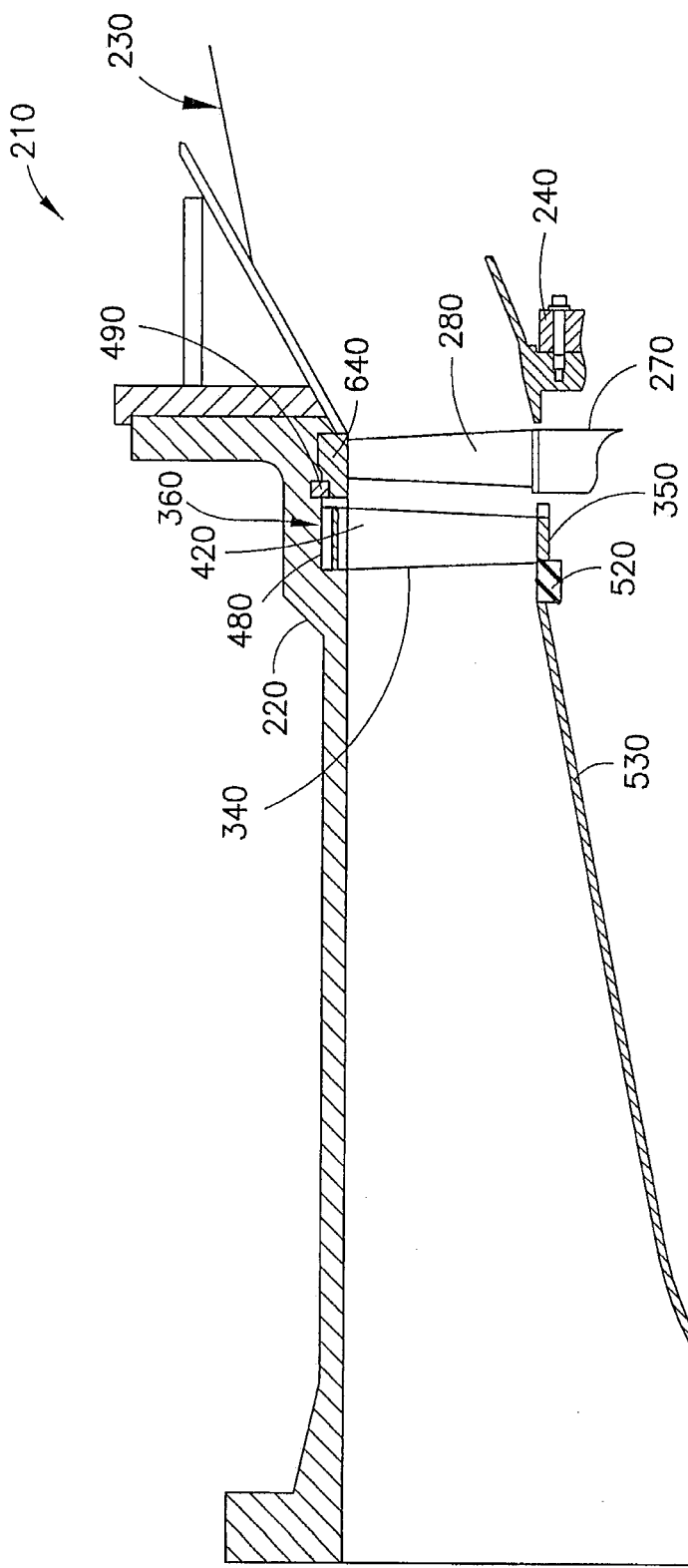
FIG. 5 is a cross-sectional view of a portion of the hot gas expander shown in FIG. 4.

With reference to FIGS. 4-5, an embodiment of a hot gas expander 210 in accordance with the present invention is shown. The hot gas expander 210 includes an inlet casing 220 and a discharge casing 230 attached to a housing 240. The inlet casing 220 receives hot gas from an industrial process while the discharge casing 230 exhausts the gas after it has been passed through hot gas expander 210. The housing 240 supports a shaft (not shown) rotatable about a longitudinal axis of hot gas expander 210. The shaft (not shown) supports a disc 270 disposed between the inlet casing 220 and the discharge casing 230. The disc 270 includes a plurality of rotor vanes 280 provided on an outer peripheral edge of disc 270. A plurality of stator blades 420 are provided adjacent to rotor vanes 280 to redirect the hot gases as they pass through hot gas expander 210.

The inlet casing 220 may be made of a first material having a first coefficient of thermal expansion, while the discharge casing 230 may be made of a second material having a second, different coefficient of thermal expansion. Desirably, the inlet casing 220 and discharge casing 230 are made of materials having similar coefficients of thermal expansion. Similarly, the disc 270 and the rotor vanes 280 may have a different coefficient of thermal expansion from the inlet casing 220 and discharge casing 230. A clearance space is desirably provided between an inner wall of the inlet casing 220 and the outermost edges of rotor vanes 280 to account for the dimensional changes of the components during the operating cycle of hot gas expander 210. Differences in coefficients of thermal expansion between these components and their support structures determine the magnitude and variability of the clearance space.

A stator diaphragm 340 having an integral inner and outer stator shroud, 350 and 360, respectively, is provided inside a retaining groove 370 inside inlet casing 220. A small radial clearance is provided between the outer stator shroud 360 and the retaining groove 370 to allow for thermal expansion of stator diaphragm 340. A plurality of stator vanes 420 is spaced apart circumferentially between the inner stator shroud 350 and outer stator shroud 360. The stator vanes 420 are desirably integrally formed with the stator diaphragm 340 from the same material to reduce the potential for warping of the stator vanes 420 due to thermal stress caused by differential thermal expansion of the inner stator shroud 350 with respect to the outer stator shroud 360.

The stator diaphragm 340 is located concentric to the flow path inside inlet casing 220. A plurality of key slots 470 are provided in a circumferential arrangement along the exterior of the outer stator shroud 360. A corresponding plurality of key slots 472 is also provided in a circumferential arrangement along the interior of retaining groove 370 such that key slots 470 on the outer stator shroud 360 may be aligned with the key slots 472 on the retaining groove 370. A plurality of keys 480 are inserted into key slots 470, 472 to prevent rotation of the stator diaphragm 340 due to the rotational torque imposed by the stator vanes 420. The keys 480 are dimensioned such that they maintain concentricity of the stator diaphragm 340 while allowing differential radial thermal growth of the stator diaphragm 340 with respect to the retaining groove 370 of the inlet casing 220. Because the use of mechanical fasteners 110 as required in the known hot gas expanders 10 shown in FIGS. 1-3, discussed previously, is eliminated, thermal stresses are reduced at both the inlet casing 220 and the stator diaphragm 340.

The stator diaphragm 340 is secured in the axial direction inside inlet casing 220 by a stator shear ring 490. The stator shear ring 490 may have a plurality of ring segments 500 joined together at their respective edges to form a circular ring. The individual ring segments 500 may be welded, bolted, or otherwise secured at their ends to form the shear ring 490. The stator shear ring 490 is inserted into a stator ring groove 510 provided at the inside surface of the inlet casing 220. The use of the stator shear ring 490 for axial retention of the stator diaphragm 340 eliminates the use of mechanical fasteners 110 as required in the known hot gas expanders 10 shown in FIGS. 1-3, discussed previously. By utilizing the stator shear ring 490 secured inside the stator ring groove 510, the need for time-consuming and expensive machining steps associated with conventional hot gas expanders is eliminated. The use of the stator shear ring 490 does not require the multiple machining steps necessary to form bolt openings and threaded holes as required in the hot gas expanders discussed previously. The elimination of these and other manufacturing steps results in a reduction in manufacturing time, cost and error potential. Axial loading imposed on the stator diaphragm 340 is further distributed over a large surface and cross-sectional area of the stator shear ring 490, thereby resulting in a lower contact and shear stress compared to the known design which utilizes a plurality of circumferentially-arranged mechanical fasteners 110. The stator shear ring 490 may be manufactured using the same material as the inlet casing 220 such that thermal stresses due to differential thermal expansion of the stator shear ring 490 inside the ring groove 510 of the inlet casing 220 is eliminated.

With reference to FIG. 5, the inner stator shroud 350 of the stator diaphragm 340 may be provided with a seal 520 at its interface with a nose cone 530. The seal 520 desirably prevents leakage of working fluid between the inner stator shroud 350 and nose cone 530. With this arrangement, stress due to the loading of the stator vanes 420 is not transferred to nose cone 530.

A rotor shroud 640 is also provided inside a retaining groove 650 inside the inlet casing 220. In a similar manner to the stator diaphragm 340, a small radial clearance is provided between the rotor shroud 640 and the retaining groove 650 to allow for thermal expansion of the rotor shroud 640. A plurality of rotor vanes 280 is spaced apart circumferentially between the disc 270 and the rotor shroud 640. The rotor shroud 640 is located concentric to the flow path inside inlet casing 220. A plurality of key slots 670 is provided in a circumferential arrangement along the exterior of the rotor shroud 640. As described previously, a corresponding plurality of key slots 672 is also provided in a circumferential arrangement along the interior of retaining groove 370 such that key slots 670 on rotor shroud 640 may be aligned with key slots 672 in the retaining groove 370. A plurality of keys 680 are inserted into key slots 670, 672 to prevent rotation of the rotor diaphragm 640. The keys 680, similar to stator keys 480, may be dimensioned such that they maintain concentricity of rotor shroud 640 while allowing differential radial thermal growth of rotor shroud 640 with respect to the retaining groove 370 of the inlet casing 220.

The rotor shroud 640 is secured in the axial direction inside the inlet casing 220 by a rotor shear ring 750. In a similar manner to the stator shear ring 490, discussed previously, the rotor shear ring 750 may have a plurality of ring segments 752 that are joined together at their respective edges to form a circular ring. The individual ring segments 752 may be welded, bolted, or otherwise secured at their ends to form the rotor shear ring 750. The rotor shear ring 750 is desirably inserted into a rotor ring groove 760 defined in the inside surface of the inlet casing 220. The use of the rotor shear ring 750 for axial retention of the rotor shroud 640 eliminates the need for mechanical fasteners as used in known hot gas expander designs.

With the structure of the hot gas expander 210 presented in the foregoing disclosure, a method of installation of inlet casing components of the hot gas expander 210 will now be described with reference to FIG. 6. In various embodiments, the stator diaphragm 340 and rotor shroud 640 are axially secured inside inlet housing 230 by a stator shear ring 490 and rotor shear ring 750, respectively. In the described embodiment, stator components are located upstream of rotor components such that stator shear ring 490 is also located upstream of rotor shear ring 750. However, it is to be understood that this described embodiment is exemplary only, and that the arrangement of rotor and stator components may be reversed.

Figure 6:
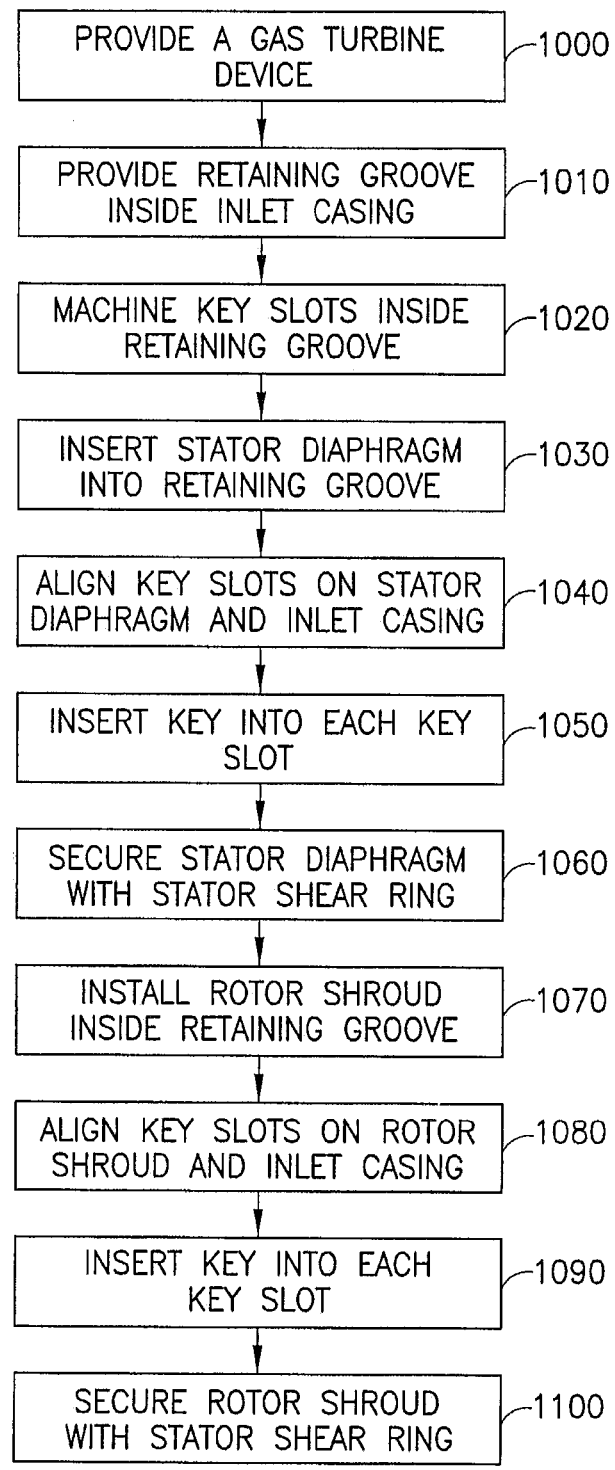
FIG. 6 is a block diagram of a method of assembling inlet casing components of a hot gas expander according to an embodiment of the present invention.

An exemplary method of installing the inlet casing components of the hot gas expander 210 illustrated in FIGS. 4 and 5 is represented in FIG. 6. The method begins at step 1000 where a gas turbine device is provided. While the method describes the assembly of inlet components for a hot gas expander 210, one of ordinary skill in the art will readily recognize that the method may be equally practiced on any gas turbine device having parts corresponding to the inlet components of hot gas expander 210. The hot gas expander 210 desirably includes an inlet casing 220 and a discharge casing 230 attached to a housing 240. A stator diaphragm 340 having an integral inner and outer stator shroud, 350 and 360, respectively, is provided inside the inlet casing 220. A plurality of stator vanes 420 are spaced apart circumferentially between the inner stator shroud 350 and outer stator shroud 360. The stator vanes 420 are desirably integrally formed with the stator diaphragm 340. The housing 240 receives a shaft (not shown) rotatable about a longitudinal axis of hot gas expander 210. The shaft supports a disc 270 disposed between the inlet casing 220 and the discharge casing 230. The disc 270 includes a plurality of rotor vanes 280 provided on an outer peripheral edge of the disc 270. At step 1010, a retaining groove 370 is provided on the interior surface of the inlet casing 220. The retaining groove 370 supports one or more inlet casing components of the hot gas expander 210. At step 1020, the retaining groove 370 is machined to have a plurality of key slots 472 arranged along the circumference of retaining groove 370. At step 1030, the stator diaphragm 340 having integral inner and outer stator shrouds, 350 and 360, respectively, is installed into retaining groove 370 of the inlet casing 220. A small radial clearance space is provided between the exterior of the stator diaphragm 340 and the interior surface of retaining groove 370 to allow for thermal expansion. The stator diaphragm 340 is desirably located concentric to the flow path inside the inlet casing 220. A plurality of key slots 470 are provided in a circumferential arrangement along the exterior of outer stator shroud 360. At step 1040, each key slot 470 on the stator diaphragm 340 is aligned with a corresponding key slot 472 in the inlet casing 220.

After aligning the corresponding key slots 470, 472, at step 1050 a key 480 is inserted into each key matted slot 470, 472 such that the keys 480 resist the rotational torque of the stator diaphragm 340. The keys 480 are dimensioned such that they maintain concentricity of stator diaphragm 340 while allowing differential radial thermal growth of stator diaphragm 340 with respect to the retaining groove 370 in the inlet casing 220. At step 1060, the stator diaphragm 340 is secured in the axial direction inside the inlet casing 220 by a stator shear ring 490. The stator shear ring 490 may have a plurality of ring segments 500 joined together at their respective edges to form a circular ring. The individual ring segments 500 may be welded, bolted, or otherwise secured at their ends to form shear ring 490. The stator shear ring 490 is inserted into a stator ring groove 510 in the inside surface of the inlet casing 220.

At step 1070, the rotor shroud 640 is installed into the retaining groove 370 in the inlet casing 220. A small radial clearance space is provided between the exterior of the rotor shroud 640 and the interior surface of the retaining groove 370 to allow for thermal expansion. The rotor shroud 640 is desirably located concentric to the flow path inside inlet casing 220. A plurality of key slots 670 is provided in a circumferential arrangement along the exterior of rotor shroud 640. A corresponding plurality of key slots 672 is provided in a circumferential arrangement along the interior of the retaining groove 370 such that the key slots 670 on rotor shroud 640 are aligned with the key slots 672 in the retaining groove 370. At step 1080, each key slot 670 on the rotor diaphragm 640 is aligned with a corresponding key slot 672 in the inlet casing 220. After aligning the corresponding key slots 670, 672, at step 1090 a key 680 is inserted into each key mated slot 670, 672 such that the keys 680 resist the rotational torque of the rotor diaphragm 640. The keys 680 are dimensioned such that they maintain concentricity of rotor diaphragm 640 while allowing differential radial thermal growth of rotor diaphragm 640 with respect to the retaining groove 370 in the inlet casing 220.

At step 1100, rotor shroud 640 is secured in the axial direction inside inlet casing 220 by a rotor shear ring 750. Rotor shear ring 750 may have a plurality of ring segments 752 joined together at their respective edges to form a circular ring. Individual ring segments 752 may be welded, bolted, or otherwise secured at their ends to form rotor shear ring 750. Rotor shear ring 750 is inserted into a rotor ring groove 760 provided at the inside surface of inlet casing 220.

While an embodiment of a hot gas expander inlet casing assembly and method for installing inlet casing components of a hot gas expander is shown in the accompanying figures and described herein in detail, other embodiments will be apparent to, and readily made by those skilled in the art, without departing from the scope and spirit of the invention. For example, while the present disclosure generally discusses a hot gas expander, it is contemplated that embodiments of the assembly and method may be applicable to other gas turbine devices. The scope of the invention will be measured by the appended claims and their equivalents.

The invention claimed is:

1. A gas turbine device, comprising:
an inlet casing provided opposite a discharge casing along a longitudinal axis of the gas turbine device;
a shaft disposed between the inlet casing and the discharge casing, the shaft being rotatable about the longitudinal axis of the gas turbine device;
a plurality of rotor vanes extending radially from the shaft;
a stator diaphragm provided inside the inlet casing, the stator diaphragm having an integral inner stator shroud and an outer stator shroud located concentric to a flow path inside the inlet casing; and
a plurality of stator vanes provided in a circumferential arrangement between the inner stator shroud and the outer stator shroud,
wherein the stator diaphragm is secured in an axial direction by a stator shear ring having a plurality of ring segments with each ring segment of the plurality of ring segments having an inner surface, an outer surface and two ends extending from the inner surface to the outer surface, wherein the plurality of ring segments are continuously welded to each other at the ends from the inner surface to the outer surface to form a continuous integral ring with continuous inner and outer surfaces, and
wherein the stator shear ring is retained inside a stator ring groove provided at an inside surface of the inlet casing.

2. The gas turbine device according to claim 1, further comprising a first set of plurality of key slots provided in a circumferential arrangement on the stator diaphragm and a corresponding second set of plurality of key slots provided in a circumferential arrangement on the inlet casing, wherein the first set of plurality of key slots provided on the stator diaphragm are aligned with the second set of plurality of key slots provided on the inlet casing.

3. The gas turbine device according to claim 2, wherein a first plurality of keys are adapted for inserting into the first set of plurality of key slots provided on the stator diaphragm and into the second set of plurality of key slot provided on the inlet casing to prevent rotation of the stator diaphragm with respect to the inlet casing about the longitudinal axis of the gas turbine device.

4. The gas turbine device according to claim 1, wherein a radial clearance space is provided between the stator diaphragm and the stator ring groove to allow for thermal expansion of the stator diaphragm.

5. The gas turbine device according to claim 1, further comprising a seal provided at an interface between the stator diaphragm and nose cone of the gas turbine device, wherein the seal is adapted to prevent leakage of working fluid between the stator diaphragm and the nose cone.

6. The gas turbine device according to claim 1, further comprising a rotor shroud provided inside the inlet casing, the rotor shroud located concentric to the plurality of rotor vanes.

7. The gas turbine device according to claim 6, further comprising a third set of plurality of key slots provided in a circumferential arrangement on the rotor shroud and a corresponding fourth set of plurality of key slots provided in a circumferential arrangement on the inlet casing, wherein the third set of plurality of key slots provided on the rotor shroud are aligned with the fourth set of plurality of key slots provided on the inlet casing.

8. The gas turbine device according to claim 7, wherein a second plurality of keys are adapted for inserting into the third set of plurality of key slots provided on the rotor shroud and into the fourth set of plurality of key slot provided on the inlet casing to prevent rotation of the rotor shroud with respect to the inlet casing about the longitudinal axis of the gas turbine device.

9. The gas turbine device according to claim 6, wherein the rotor shroud is provided inside a retaining groove on the inlet casing and a radial clearance space is provided between the rotor shroud and the retaining groove to allow for thermal expansion of the rotor shroud.

10. The gas turbine device according to claim 6, wherein the rotor shroud is secured in an axial direction by a rotor shear ring having a plurality of ring segments coupled at their respective ends.

11. The gas turbine device according to claim 10, wherein the rotor shear ring is disposed inside a rotor ring groove provided inside the inlet casing.

12. The gas turbine device according to claim 11, wherein the rotor ring groove is provided inside the rotor ring groove of the inlet casing.

13. A method of assembling inlet casing components of a gas turbine device, the method comprising the steps of:
(a) providing a gas turbine device, comprising:
an inlet casing provided opposite a discharge casing along a longitudinal axis of the gas turbine device;
a shaft disposed between the inlet casing and the discharge casing, the shaft being rotatable about the longitudinal axis of the gas turbine device;
a plurality of rotor vanes extending radially from the shaft;
a stator diaphragm provided inside the inlet casing, the stator diaphragm having an integral inner stator shroud and an outer stator shroud located concentric to a flow path inside the inlet casing; and
a plurality of stator vanes provided in a circumferential arrangement between the inner stator shroud and the outer stator shroud,
wherein the stator diaphragm is secured in an axial direction by a stator shear ring having a plurality of ring segments with each ring segment of the plurality of ring segments having an inner surface, an outer surface and two ends extending from the inner surface to the outer surface, wherein the plurality of ring segments are continuously welded to each other at the ends from the inner surface to the outer surface to form a continuous integral ring with continuous inner and outer surfaces, and
wherein the stator shear ring is retained inside a stator ring groove provided at an inside surface of the inlet casing;
(b) providing a retaining groove inside the inlet casing, the retaining groove having a first set of plurality of key slots in a circumferential arrangement;
(c) inserting the stator diaphragm inside the retaining groove such that a second set of plurality of key slots provided in a circumferential arrangement on the stator diaphragm are aligned with the first set of plurality of key slots on the retaining groove;
(d) securing the stator diaphragm inside the retaining groove by inserting a fir key into each of the second set of plurality of key slots on the stator diaphragm and the first set of plurality of key slots on the retaining groove; and (e) installing the stator shear ring inside the stator ring groove provided on the retaining groove to prevent axial movement of the stator diaphragm.

14. The method according to claim 13, further comprising the steps of:
(f) inserting a rotor shroud inside an additional retaining groove such that a third set of plurality of key slots provided in a circumferential arrangement on the rotor shroud are aligned with a fourth set of plurality of key slots on the additional retaining groove;
(g) securing the rotor shroud inside the additional retaining groove by inserting a second key into each of the third set of plurality of key slots on the rotor shroud and the fourth set of plurality of key slots on the additional retaining groove; and
(h) installing a rotor shear ring inside a rotor ring groove provided on the inlet casing to prevent axial movement of the rotor shroud.

15. The method according to claim 14, wherein the first key and the second key for securing the stator diaphragm and the rotor shroud inside the inlet casing are dimensioned such that they maintain concentricity of the stator diaphragm and the rotor shroud with respect to the inlet casing while allowing for differential radial thermal growth of the rotor shroud and the stator diaphragm with respect to the additional retaining groove and the retaining groove, respectively.

16. The method according to claim 14, wherein a radial clearance space is provided between the rotor shroud and the additional retaining groove to allow for thermal expansion of the rotor shroud.

17. The method according to claim 13, wherein a radial clearance space is provided between the stator diaphragm and the retaining groove to allow for thermal expansion of the stator diaphragm.

* * * * *

UNITED STATES PATENT AND TRADEMARK OFFICE
CERTIFICATE OF CORRECTION

| | |
|---|---|
| PATENT NO. | : 9,863,321 B2 |
| APPLICATION NO. | : 13/982552 |
| DATED | : January 9, 2018 |
| INVENTOR(S) | : Ronald John Josefczyk et al. |

It is certified that error appears in the above-identified patent and that said Letters Patent is hereby corrected as shown below:

Column 12, Line 64, Claim 13, delete "fir" and insert -- first --

Signed and Sealed this
Seventeenth Day of April, 2018

Andrei Iancu
*Director of the United States Patent and Trademark Office*